(No Model.) 3 Sheets—Sheet 1.
W. J. EDWARDS.
VELOCIPEDE SADDLE.
No. 491,162. Patented Feb. 7, 1893.
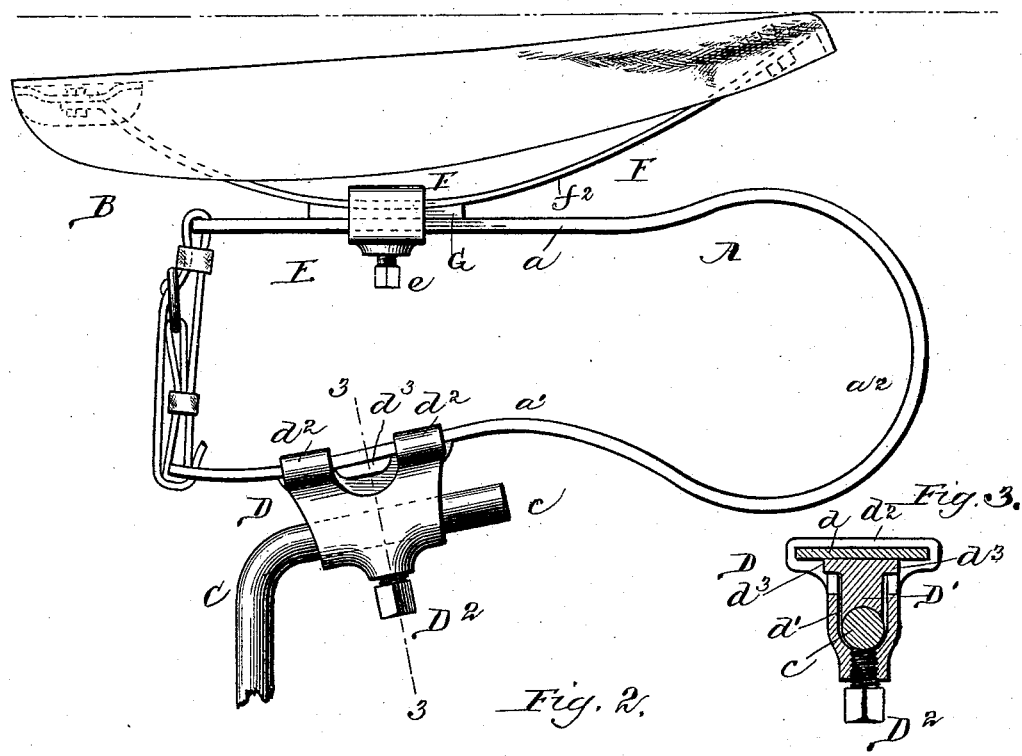
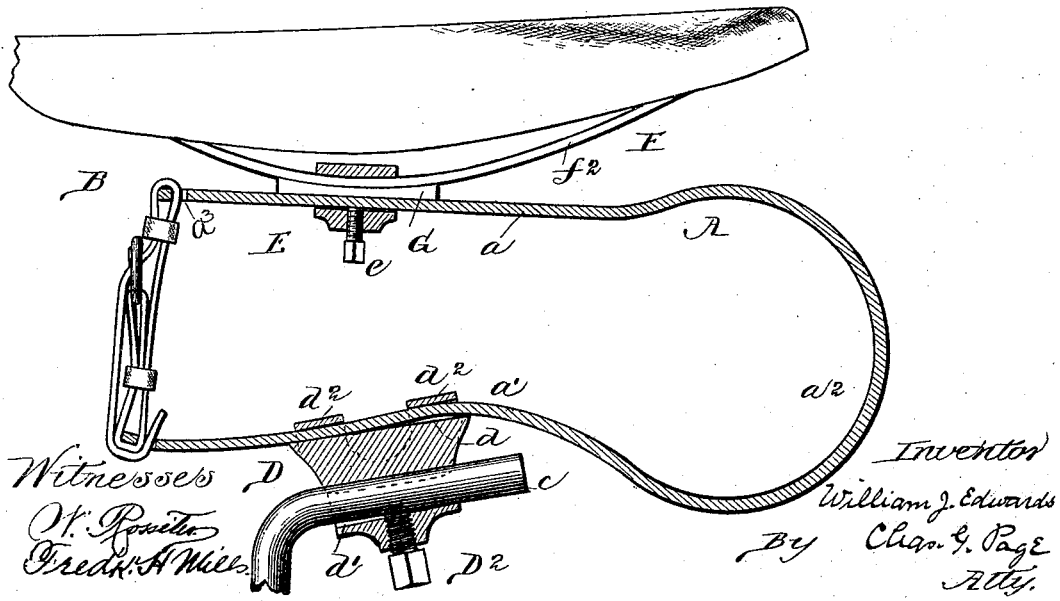

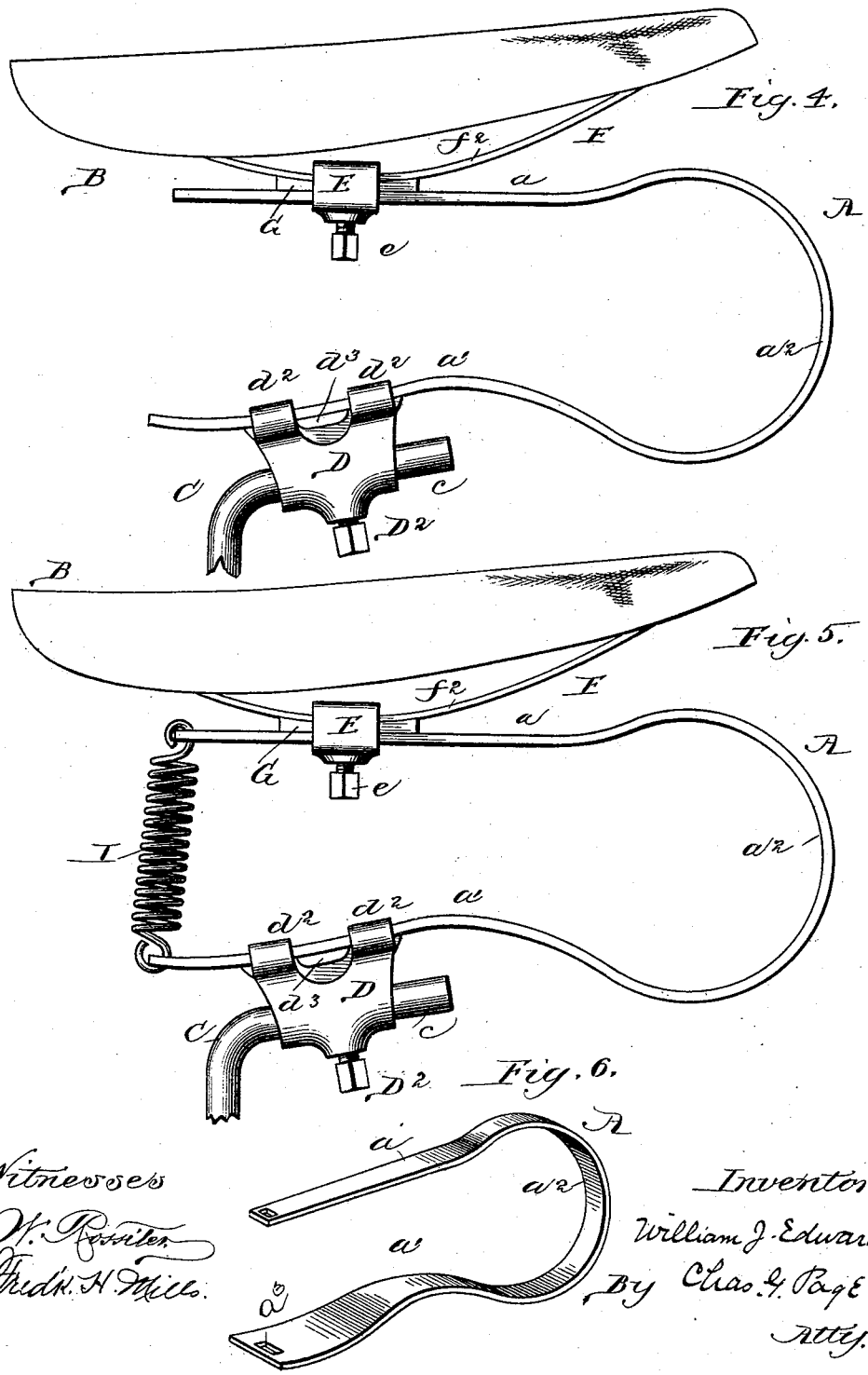

(No Model.) W. J. EDWARDS.
VELOCIPEDE SADDLE.
No. 491,162. Patented Feb. 7, 1893.
3 Sheets—Sheet 3.
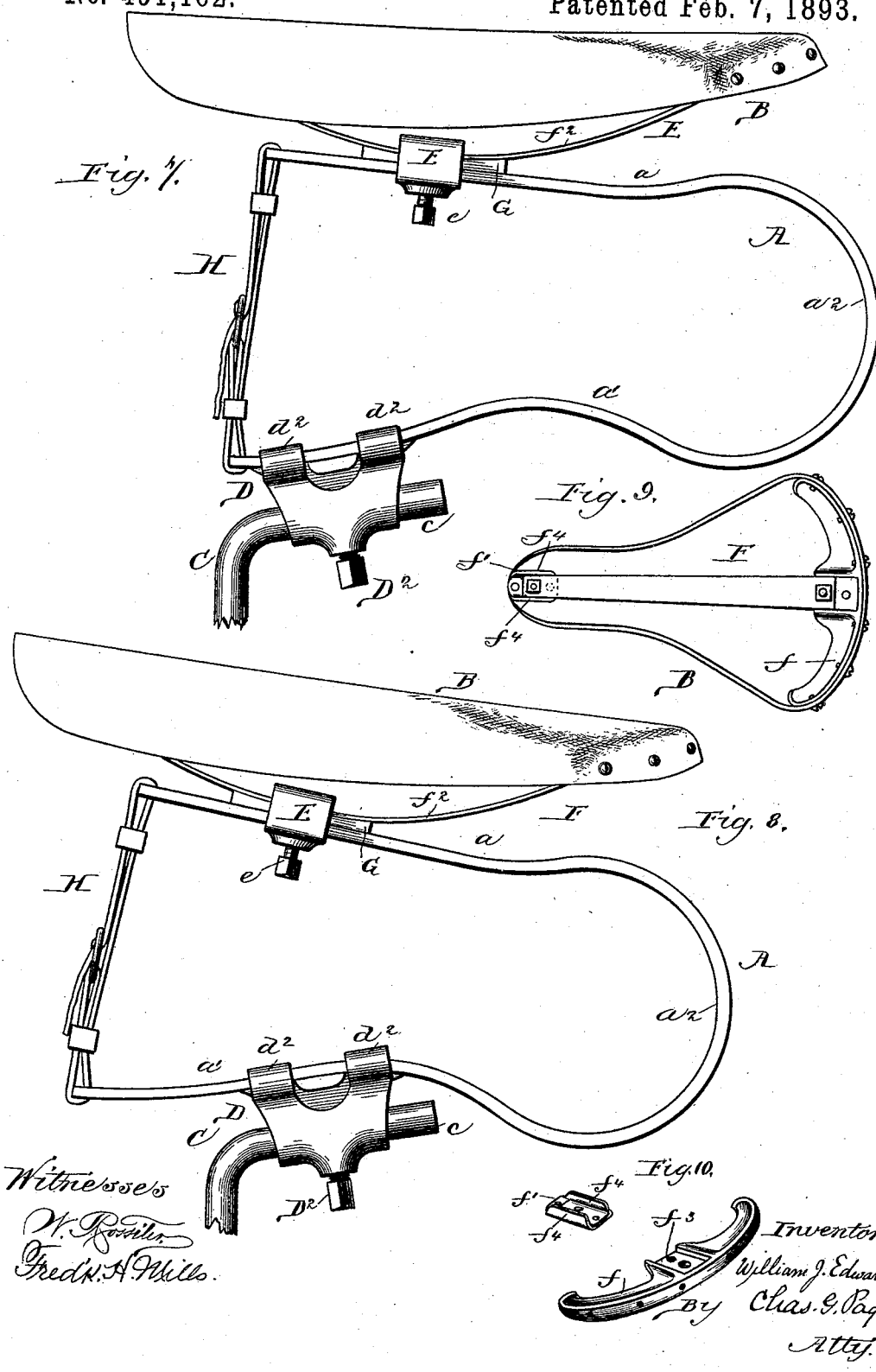

United States Patent Office.

WILLIAM J. EDWARDS, OF CHICAGO, ILLINOIS, ASSIGNOR TO THE UNION MANUFACTURING AND PLATING COMPANY, OF SAME PLACE.

VELOCIPEDE-SADDLE.

SPECIFICATION forming part of Letters Patent No. 491,162, dated February 7, 1893.

Application filed December 14, 1889. Renewed July 13, 1891. Serial No. 399,278. (No model.)

*To all whom it may concern:*

Be it known that I, WILLIAM J. EDWARDS, a citizen of the United States, residing at Chicago, in the county of Cook and State of Illinois, have invented a certain new and useful Improvement in Velocipedes, of which the following is a specification.

My invention relates to spring supported velocipede seats or saddles involving the employment of a seat or saddle supporting spring consisting of a flat spring bar bent into U-shape or proximately U-shape so as to provide it with two substantially parallel arms or legs whereof one is arranged to lie above the other so as to serve as a direct support for the seat or saddle as it may indifferently be termed.

A prominent object of my invention is to permit in connection with a seat-spring of such nature, all of the several adjustments desirable on the part of the seat, to wit: its adjustment in height; its adjustment forward and back, and its tilt or adjustment to such angle as may be desired by the rider, and to further permit the ready adaptation of the spring to the weight of the rider by varying its resistance to the weight so that it may in effect be made weaker or stronger proportionally to the load it is to sustain.

Further objects are to attain greater efficiency of action on the part of a substantially U-shaped velocipede seat spring; to vary the extent to which it may vibrate when the machine is in use; to improve the seat or saddle frame, and to provide certain novel and useful details constituting matters of improvement.

To the attainment of the foregoing and other useful ends my invention consists in matters hereinafter set forth and particularly pointed out in the claims.

In the accompanying drawings: Figure 1, represents in side elevation a velocipede seat or saddle supported in accordance with my invention. Fig. 2, is a somewhat similar view, partly in side elevation and partly in vertical central section on a plane longitudinally through the spring A, with said spring adjusted so as to raise the forward end of the seat somewhat higher than in Fig. 1. Fig. 3, is a cross-section on line 3—3 in Fig. 1. Fig. 4, is a view similar to Fig. 1, with the strap omitted. Fig. 5, is a view similar to the preceding figure with a spring employed in place of the strap. Fig. 6, shows the seat spring A in perspective. Fig. 7, illustrates in side elevation the spring A with the ends of its arms sprung wider apart than in preceding figures, and with the strap adjusted accordingly. In this view the seat is held on a level and elevated. Fig. 8, is a like view but with the lower arm of the spring A adjusted forward in its holder. Fig. 9, is a plan view of the underside of the seat. Fig. 10, represents the front and rear portions of the seat frame in detail.

A indicates the proximately U-shaped seat-spring which is arranged so as to place one of its arms above the other. The upper arm, $a$, of this spring carries the saddle B, while its lower arm, $a'$, is held upon the rearwardly bent upper end portion, $c$, of the seat-standard C. Said spring is formed by a flat bar of spring metal which is bent between its ends so as to produce the proximately U-shaped spring. The upper arm of this spring supports the seat while its lower arm is supported upon some suitable portion of the velocipede frame, the portion of such frame herein shown being a seat standard suitable for bicycles, tandems, and the like. To attain the greatest efficiency in the action of this spring the bar of which it is formed is gradually widened from the outer end of the upper arm of the spring to the outer end of the lower arm thereof, in which way the lower arm will be stiffer than the upper arm, and the resiliency of the spring increase toward the end of its upper arm. The lower arm $a'$ of the spring is adjustably held in a block or holder D which is in turn adjustably held upon the horizontal or proximately horizontal portion, $c$, of the seat standard. Said lower arm of the spring is also curved or inclined downwardly from rear to front for a portion of its length so that by adjusting it longitudinally and independently of its holder, the spring as a whole can be raised or lowered.

By the foregoing arrangement several independent adjustments are involved in the connection between the spring and the seat standard. By adjusting holder D upon the seat-standard the spring and hence the seat can be shifted forwardly or back as may be desired. By adjusting the spring independently of the holder the spring can be raised or lowered according to the direction in which it is adjusted, and hence the seat or saddle be correspondingly raised or lowered in height. When the spring is adjusted forwardly upon the holder the latter can be set back upon the standard so as to compensate for such bodily forward movement of the seat as may have been incident to the forward thrust of the lower arm of the spring in the holder, and conversely when the spring is shifted back in the holder, the latter can be set forward upon the standard. Said adjustment of the spring also serves to vary its spring resistance to the load.

The upper arm $a$ of the spring is preferably made straight and the seat is adjustably held thereon by a clamp or holder E which can be shifted along the spring so as to support the seat thereon nearer to or farther from the bend $a^2$ in the spring. By thus adjusting the holder E the upper arm $a$ of the spring can in effect be either shortened or lengthened so as to vary the supporting power of the spring, it being observed that for a heavy rider the holder E should be nearer the bend $a$ in the spring than for a comparatively light rider, and that for a rider of light weight, the clamp E can be shifted nearer to the forward end of the spring. While this adjustment of the holder E toward or back from the forward end of the upper arm of the spring will cause the saddle to be correspondingly shifted forward or back, such shift in position on the part of the saddle can be compensated for by adjusting the lower holder D upon the upper portion $c$ of the seat standard, or by adjusting the lower arm of the spring in said lower holder, or by adjusting both the holder D upon the seat standard and also adjusting the lower arm of the spring in its holder, in which way the saddle can be placed in proper position should the adjustment of holder E have set it either too far forward or back.

The saddle cover $b$ is stretched upon a frame F comprising the rear transversely arranged frame portion $f$ upon which the rear wide end of the cover is secured; the short longitudinally arranged front frame portion $f'$ upon which the forward narrow end of the cover is fastened, and a longitudinally arranged flat semi-elliptic stretching spring $f^2$ which at its ends engages said forward and rear frame-portions $f$ and $f'$. The flat semi-elliptic stretching spring $f^2$ may be permanently attached to one of the forward and rear frame-portions and adjustably attached to the other, or it can be adjustably attached to both, but as a simple and preferred arrangement the rear frame portion is made in one piece and formed with a seat $f^3$ in which the rear end of the semi-elliptic or bow spring is adjustably secured (for example by a bolt and nut) while on the other hand the forward end of the spring is permanently secured to the forward frame portion $f'$. Said forward frame portion herein consists of a plate which is bent downwardly along its side edges as at $f^4$, $f^4$, so as to form a sort of socket or holder in which the forward end portion of the spring can be received and secured. By such arrangement the forward end portion of the spring $f^2$ will be held between the lips or turned down side edge portions, $f^4$, of the plate so as to hold the latter against side tilt. The bow spring $f^2$ is also adjustable in its holder E whereby the pitch of the saddle can be varied, and also whereby the portion of the spring between either one of its ends and the point where the spring is held by the holder E can be rendered longer or shorter than the other portion of the spring between said holder and its opposite end.

By all of the foregoing adjustments, the saddle can be positioned to suit the rider; the proper pitch or tilt of the saddle can be attained, and the spring can be adjusted with reference to the weight of the rider. When the lower arm of spring A is thrust forward independently of its holder or bearing D, the spring will as a whole be somewhat tilted if the inclined forward portion of its lower arm is formed on a curve as shown, and conversely where said lower arm is adjusted rearwardly and independently of its holder the spring will also be tilted should its arm possess the curve above mentioned. In the first instance therefore there will be a tendency on the part of the forward end of the seat to tilt upwardly, and in the second instance there will be a tendency on the part of its said end to tilt downwardly. Should, however, it be desired under such circumstances to maintain the seat in a horizontal position or at any angle other than that it has been caused to assume by reason of the end adjustment of arm $a'$ of the spring independently of the holder or bearing D, the same can be attained by adjusting the stretching spring of the seat independently of its allotted holder or bearing E. I may however make the downwardly inclined forward end portion of arm $a'$ of spring A straight and adapt its bearing accordingly, in which case the end adjustment of said arm independently of the bearing will either raise or lower the saddle without tilting it. As a preferred construction however I curve the said arm $a'$ of the seat spring.

While the holders or bearings D and E can be constructed in various obvious mechanical ways to admit of their adjustments upon the seat-standard and spring arm $a$, respectively, and to further admit of the adjustment of the spring arm $a'$ independently of the holder D, and the adjustment of the bow-shaped stretching spring $f^2$ independently of the holder E, I have herein shown for each holder a simple, efficient and preferred construction, as follows, to wit: The holder D is provided with a passage way $d$ for the broad flat arm $a'$ of spring A which said passageway conforms transversely to the transverse section of said spring arm. The holder D is also channeled or recessed longitudinally so as to provide it with a recess $d'$ which is adapted to receive a gib D' and which opens into the passage-way $d$ so as to allow the gib to be held against the underside of the spring. The passage $d$ is wider than the space for the gib so as to provide a broad socket for the spring and thereby steady the same. The upper portion $c$ of the seat standard extends through the lower portion of the space $d'$ and the gib D' rests upon and fits said portion of the seat standard as best shown in Fig. 3. The holder is also provided with a set-screw $D^2$ which can be tightened up against the seat standard. By this arrangement, the gib can be tightened against the spring and the latter clamped between the gib and upper portion of the holder, by simply tightening up a single setscrew $D^2$, and conversely, when it is desired to either adjust the spring independently of the holder or to adjust the holder upon the seat-standard, either or both of said adjustments can be made after said single set-screw $D^2$ has been loosened. I prefer to form the inclined arm $a'$ of the spring upon a slight curve, and to more readily adapt the holder to such portion of the spring and to better insure a bearing between the spring and the holder at the forward and rear ends of the latter, the socket or passage for the spring is formed by two substantially rectangular loops $d^2$ with which the body of the holder can be cast or otherwise provided respectively at its forward and rear ends. I also provide the gib with laterally projecting lugs, $d^3$ which lie within the space between these loops $d^2$ so as to prevent the gib from working out so long as the spring is within the holder. It will be obvious from Fig. 3 however that prior to the insertion of the spring the gib can be inserted by introducing it with its lugs in position to enter by way of the socket or passage through one of the loops, and that after such introduction of the gib it can be allowed to drop down and lock in place within the body of the holder, after which the spring can be inserted through the loops and thereby extended through the passage which the loops thus arranged serve to provide. The holder E comprises a socket piece or broad loop which is provided with a set-screw $e$ and adapted to receive the upper arm of spring A, the bow-spring $b^2$ and a key or gib G which is interposed between the two springs. The key or gib G is flat on its underside in conformity with the flat arm $a$ of spring A, but has its upper side concaved in conformity with the curvature of the stretching spring $b^2$. By tightening the set-screw $e$ the two springs and gib will be clamped together, while by loosening said set-screw the holder can be adjusted upon spring A, or the stretching spring $b$ can be adjusted in the holder as may be desired.

While the arms $a$ and $a'$ of spring A can for some purposes have no connection between their outer ends I prefer employing a flexible, adjustable connection between said ends of the springs.

In Figs. 1 and 2 I have shown a connection consisting of a strap H passing through eyes or openings $a^3$ in the end portions of the arms $a$ and $a'$, and provided with a buckle so that the length of strap connection between the ends of the arms' spring can be varied. By such arrangement the extent to which the arms of spring A may spread apart, can be regulated, that is to say, the extent to which its upper free arm may be permitted to rise above its lower secured arm can be determined by the adjustment in length of the strap. In this way the latitude of vibratory movement of the free arm of the spring can be practically controlled. Thus for a rider of comparatively light weight it will not be necessary to draw down the spring arm $a$ to such an extent as it should be drawn down for a rider of comparatively heavy weight, since the light weight rider will not depress said arm to the extent that a heavy weight rider will depress it and hence in riding over abrupt obstructions or into abrupt depressions on or in the road, the upward throw of the spring subject to a light weight will not be so great as when subject to a heavy weight.

The manner of connecting the ends of the springs as above described forms a prominent improvement owing to its simplicity and ready adaptability, as it only requires the forming of eyes or openings at or in the ends of said spring arms for the passage of the strap, which is a comparatively inexpensive construction. Furthermore the strap can be readily applied to and detached from the spring, and when so detached the spring will be left without any projections or enlargements and hence it can be slipped from the bearings which secure it to the frame of the velocipede and to the seat. Also a great range of adjustment can be secured by the use of the strap for it is obvious that the greatest and smallest adjustment can be obtained with one and the same strap. The readiness and expedition with which said adjustments can be accomplished, and the entire freedom from great or excessive wear, obviously provide a highly efficient and desirable improvement.

The presence of an adjustable flexible or yielding connection between the two arms of the spring also involves a desirable feature incident to the adjustment of the lower arm of the spring independently of its holder or bearing. Thus, in Fig. 7 I have shown the strap so lengthened as to permit the arms of the spring to normally stand at a greater distance apart than in several of the preceding figures. In said view I have also shown the lower arm of spring A set back independently of its holder or bearing, so as to place the upper free arm of the spring in a horizontal position, with the stretching seat spring held midway of its ends and the seat set horizontally. Should the lower arm of spring A as shown in said figure be adjusted forward and independently of its holder or bearing, the seat will be lowered but at the same time will be tilted as in Fig. 8, assuming the downwardly inclined end portion of the spring to be formed on a curve. To now bring the seat to a horizontal position without adjusting the stretching spring in its holder or bearing E, the strap can be shortened so as to draw down arm a and thus again place the seat in a horizontal position.

For certain purposes I may of course omit the strap and buckle or analogous flexible or yielding and adjustable device for holding down the free arm of spring A, but I prefer to employ some adjustable connection which while limiting the rise of the said arm will permit its depression under the weight of the rider.

In Fig. 5 I have shown as a connection between the arms of the spring and the means for holding down the upper free arm of the spring arm a, a spring, I. This spring is self-adjusting and hence in one respect is an adjustable connection between the arms of the spring. It resists too great rise on the part of the upper arm of spring A, and it permits the depression of said arm. When the free arm of spring A is depressed the spring I, will likewise be compressed so as to sustain a portion of the weight and hence form a spring cushion. It may also be observed that by the foregoing arrangement the seat and spring A can be reversed when so desired.

What I claim as my invention is:

1. A seat-spring for velocipedes bent to provide it with an upper seat supporting arm and a lower arm which is inclined and adjustably held by a bearing so that by adjusting said lower arm independently of its bearing the height of the seat can be varied.

2. The bent seat spring provided with an upper straight seat supporting arm a, and a lower arm a', which is adjustably held on the velocipede and for a portion of its length inclined downwardly toward its outer end, for the purpose described.

3. A seat spring formed with an upper seat supporting arm, and a lower inclined arm a', combined with a bearing which is adjustably supported and which adjustably holds said lower arm of the seat spring, whereby the seat can be adjusted vertically and longitudinally.

4. A seat provided with a spring for supporting the same, said spring being bowed, and a spring supported bearing adjustably connected with the bowed portion of said spring so that by adjusting the bowed spring on its bearing the seat can be tilted.

5. A seat provided with a spring for supporting the same, said spring being bowed, a bearing adjustably connected with the bowed portion of said spring, and a supporting spring upon which said bearing is adjustably held.

6. The combination of a substantially U-shaped spring, the saddle provided with a spring for supporting the same, said spring being bowed, and a bearing adjustably held on the upper arm of the substantially U-shaped spring and adjustably holding the bowed portion of the spring of the seat, for the purpose described.

7. The combination with the seat supporting spring A of the holder or bearing D provided with a gib and set-screw for the purpose set forth.

WILLIAM J. EDWARDS.

Witnesses:
CHAS. G. PAGE,
ANNIE L. COATES.